Figure 1:
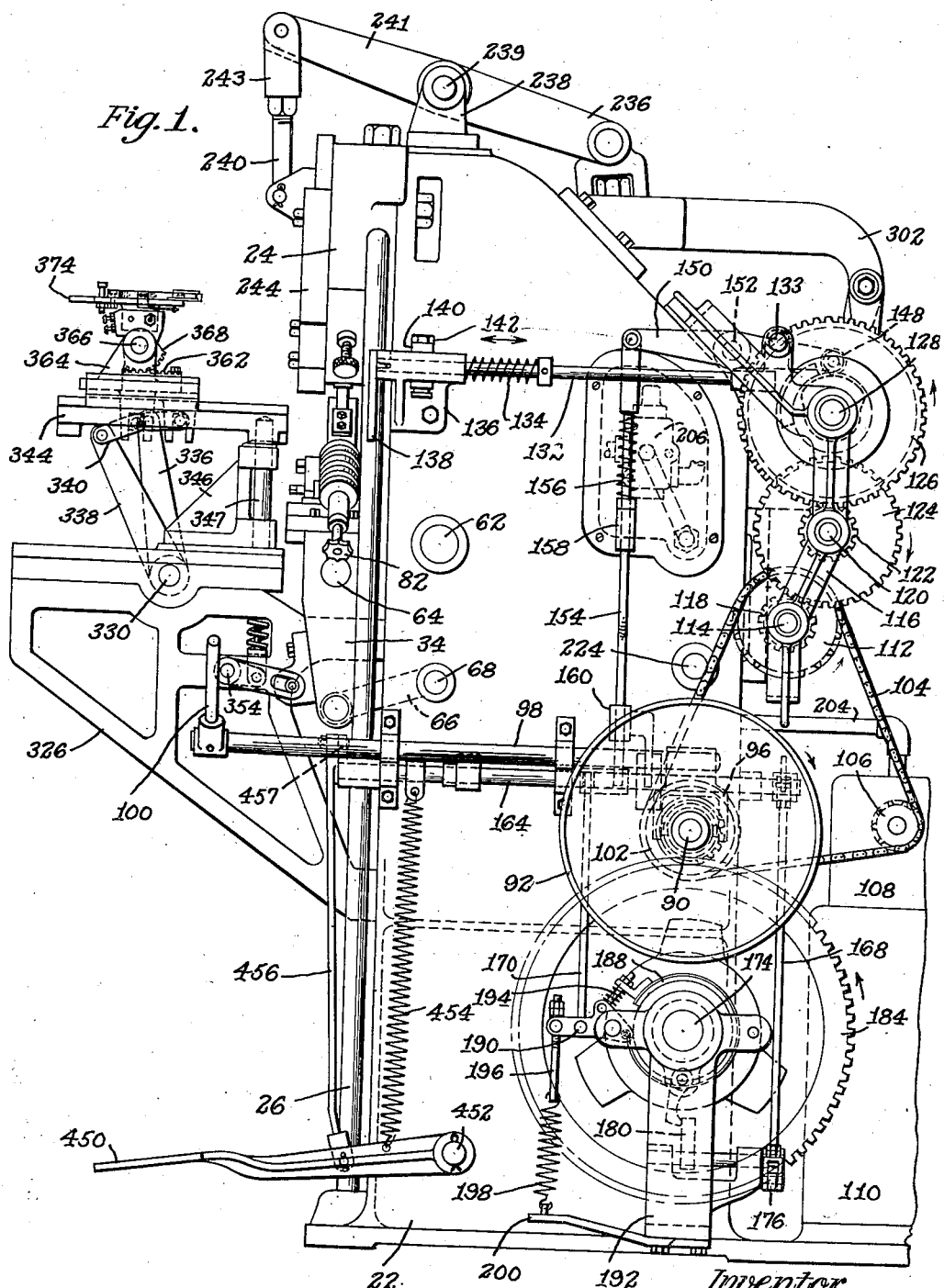

Jan. 2, 1940.    C. W. BAILEY    2,185,937
COUNTER MOLDING MACHINE
Filed Feb. 28, 1939    8 Sheets-Sheet 3

Fig. 3.

Inventor
Charles W. Bailey
by Kenway & Witter
Attorneys

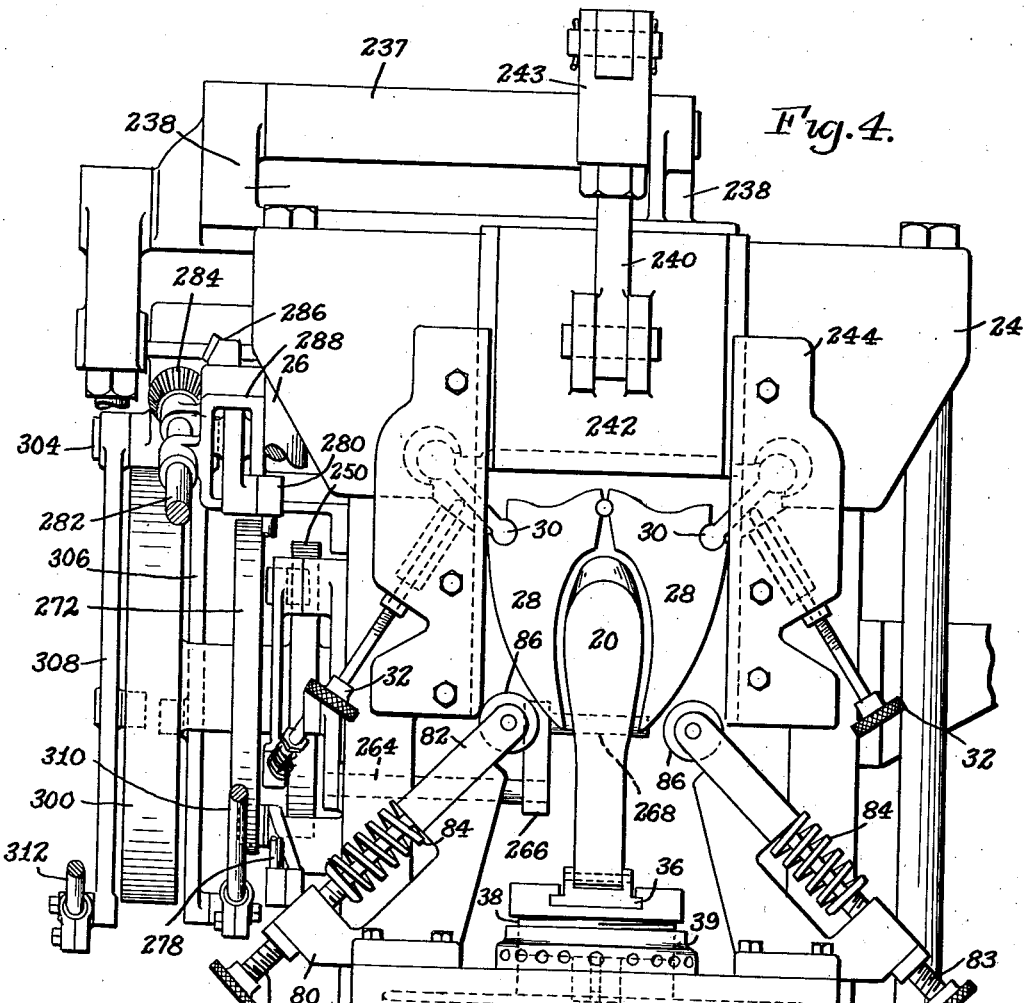
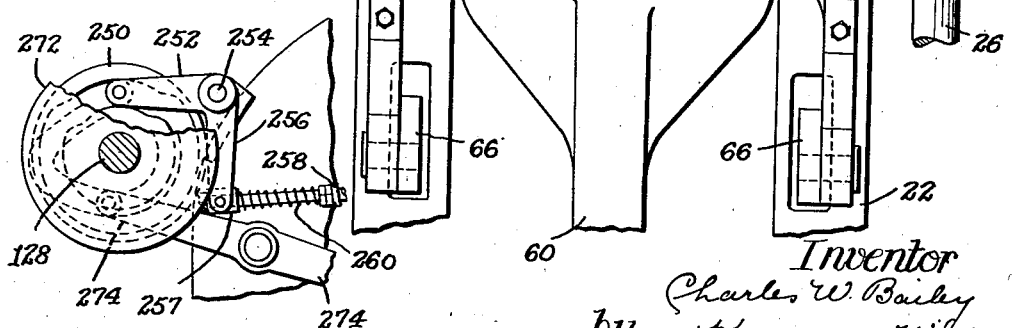

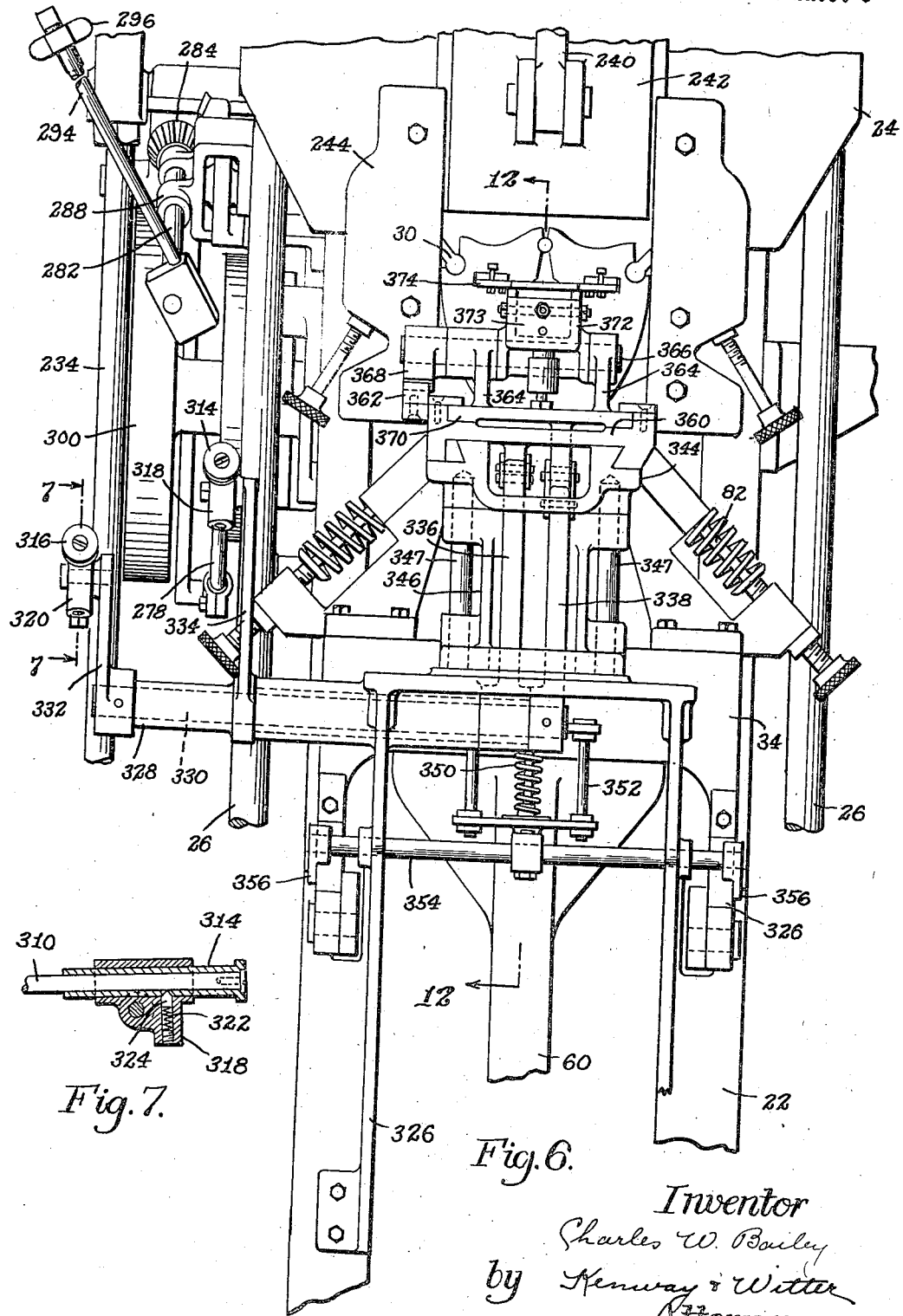

Jan. 2, 1940. C. W. BAILEY 2,185,937
COUNTER MOLDING MACHINE
Filed Feb. 28, 1939 8 Sheets-Sheet 6
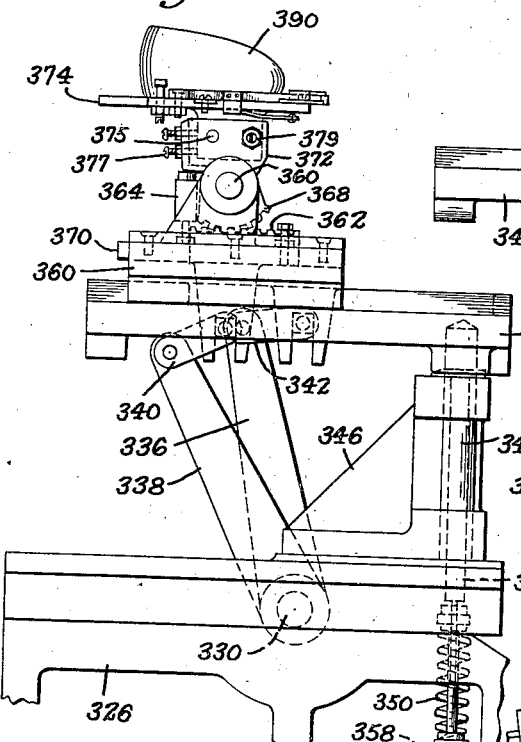
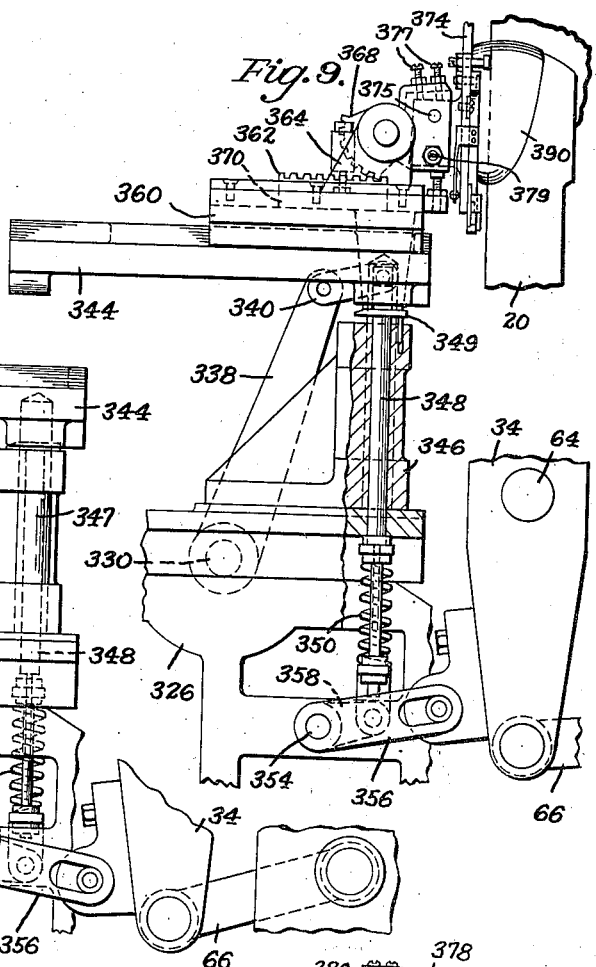
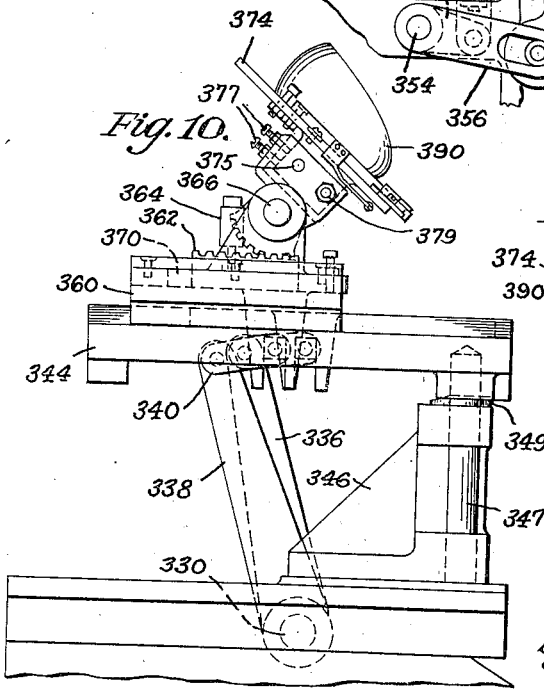
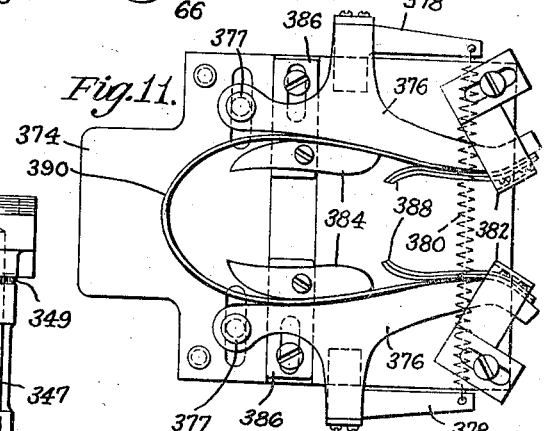
Inventor
Charles W. Bailey
by Kenway & Witter
Attorneys

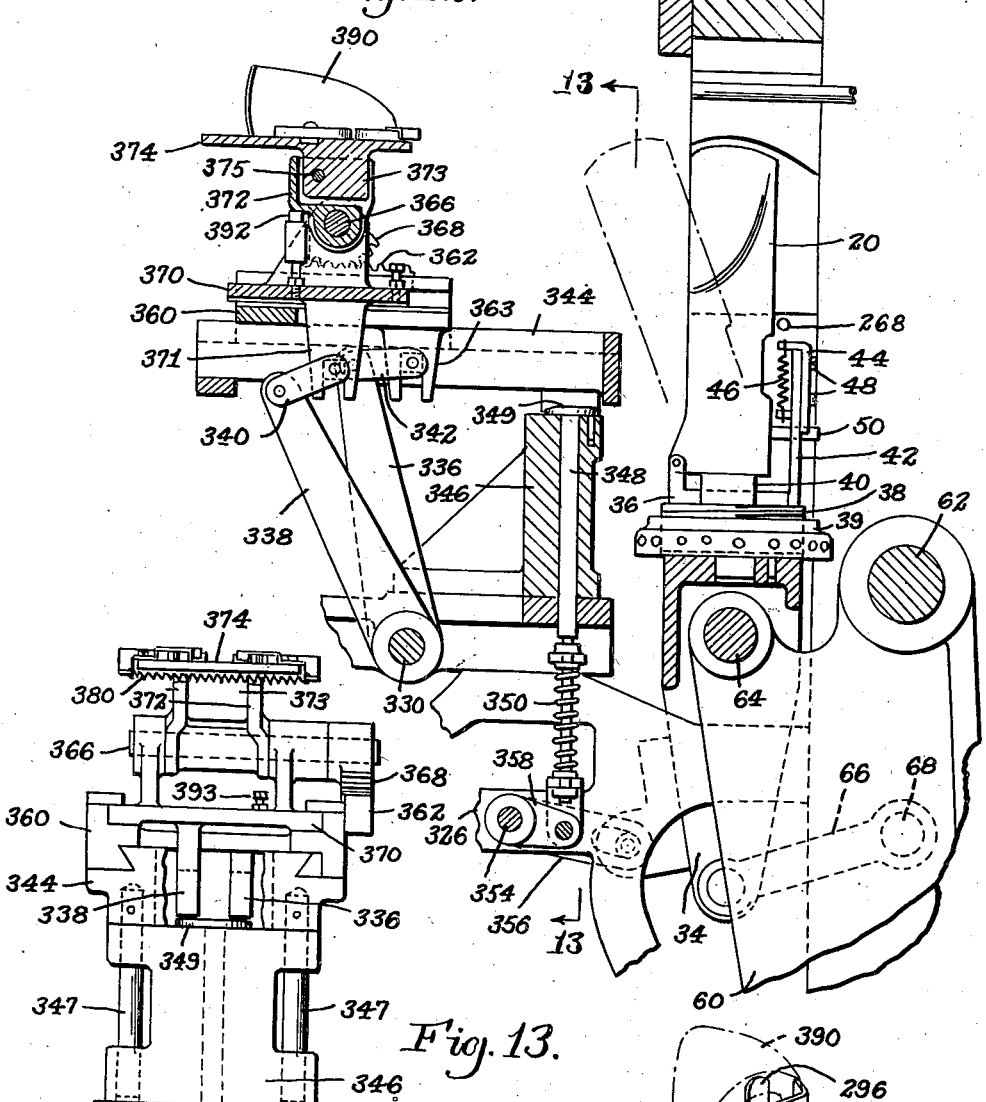

Jan. 2, 1940.  C. W. BAILEY  2,185,937
COUNTER MOLDING MACHINE
Filed Feb. 28, 1939  8 Sheets-Sheet 8
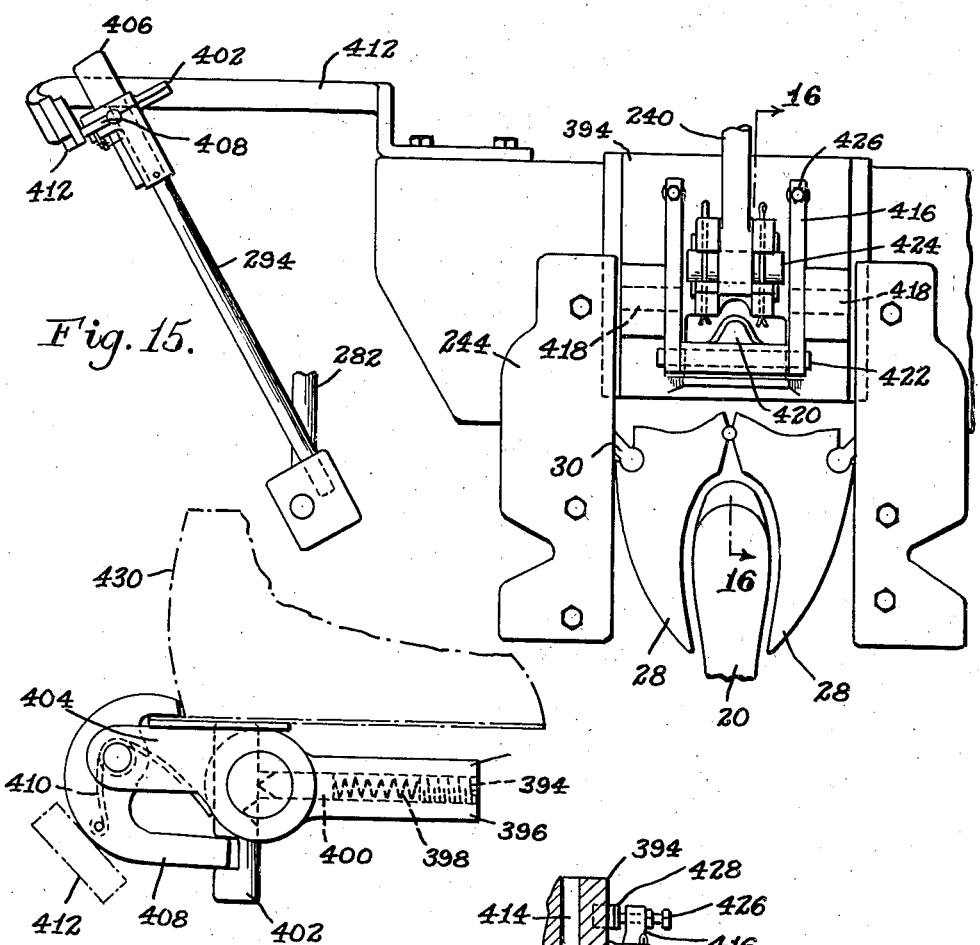
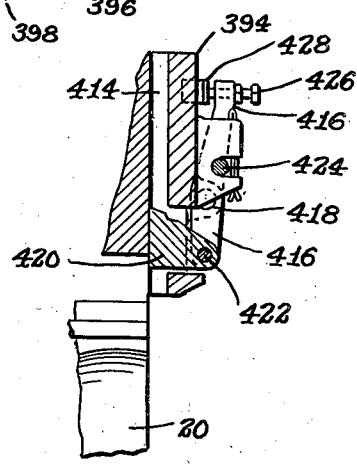
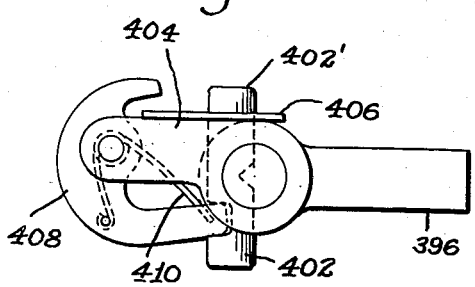
Inventor
Charles W. Bailey
by Kenway & Witter
Attorneys Patented Jan. 2, 1940

2,185,937

UNITED STATES PATENT OFFICE 2,185,937

COUNTER MOLDING MACHINE

Charles W. Bailey, Lynn, Mass., assignor to Stewart Bros. Inc. of Lynn, Lynn, Mass., a corporation of Massachusetts Application February 28, 1939, Serial No. 258,963

20 Claims. (Cl. 12—66)

My invention relates to machines for molding such articles as shoe counters or the like and consists in improvements in the mold actuating mechanism of such machines as well as in the provision of automatic controlling mechanism and improved automatic feeding and doffing devices—all resulting in a more efficient machine having a higher rate of production and requiring less skill on the part of the operator than machines heretofore known.

In operating counter molding machines, it is the practice to close the cooperating molds upon the curved counter blank, first in a preliminary manner and then under a final heavy molding pressure, the ordinary cycle of such a machine being arranged to impart two separate heavy molding pressures after the preliminary mold-closing step has taken place. Although attempts have been made to provide such machines with automatic feeders in order to avoid the danger of having the operator insert his fingers between the molds, the feeders heretofore available have not been satisfactory in many ways.

A counter molding machine operated without a mechanical feeder requires a skilled operator in order to produce uniformity and speed of production. This is so because the counter blanks must be accurately positioned on the central mold and because the operator cannot let go of a blank before the molds are engaged as otherwise the blank is likely to become misplaced and improperly molded.

One object of the invention is to eliminate danger to the machine operator by rendering it unnecessary for him to approach the molds with his hands at any time while the machine is operating. This object is accomplished by providing an automatic feeder which moves in and out of the machine, the counter blank being placed in it by the operator while the feeder is in a position remote from the molds and being accurately inserted in the molds by the movement of the feeder.

Another object of the invention is to render automatic a counter molding machine of the type disclosed in my U. S. Patent No. 2,085,731 wherein the molding pressure is obtained by two independent trains of mechanism, one of which is hydraulic, operating through a bell crank lever which elevates the central mold or plug of the molding machine.

A further object of the invention is to provide a molding machine which may be operated automatically by means of cam actuated mechanism or which may be treadle controlled according to the requirements of the work in hand. The machine may be operated automatically when steady production is desired and treadle controlled at other times or during the setting up process preliminary to a regular production run.

An important feature of the invention resides in independently operated means for moving the feeder in and out of the machine and for tilting it from loading position to feeding position, a feature which results in a quiet, easy-running, convenient mechanism.

Another feature of the invention resides in the combination of hydraulic and mechanical trains of mold-actuating mechanism both controlled by a single cam, thus maintaining the two trains absolutely in proper timed relationship and resulting in uniform and accurate operation of the machine.

A further feature of the invention resides in the provision of a locking pin which, in one position, completes the train of mechanism between an automatic control device and the molds and, in another position, positively locks the starting handle for the automatic control device in inoperative position. This is an important double safety feature which positively prevents automatic actuation of the molds when the machine is under treadle control. The operator is thus relieved of the danger of losing his fingers as the result of inadvertently permitting the machine to turn over while he is adjusting the setting of the molds. Furthermore the automatic control can be connected only at one point in the cycle of the machine (by re-inserting the locking pin), thus ensuring maintenance of the properly timed sequence of the various movements of the machine.

These and other objects and features of my invention will be more readily understood and appreciated from the following detailed description of a preferred embodiment thereof selected for purposes of illustration and shown in the accompanying drawings, in which—

Figure 2:
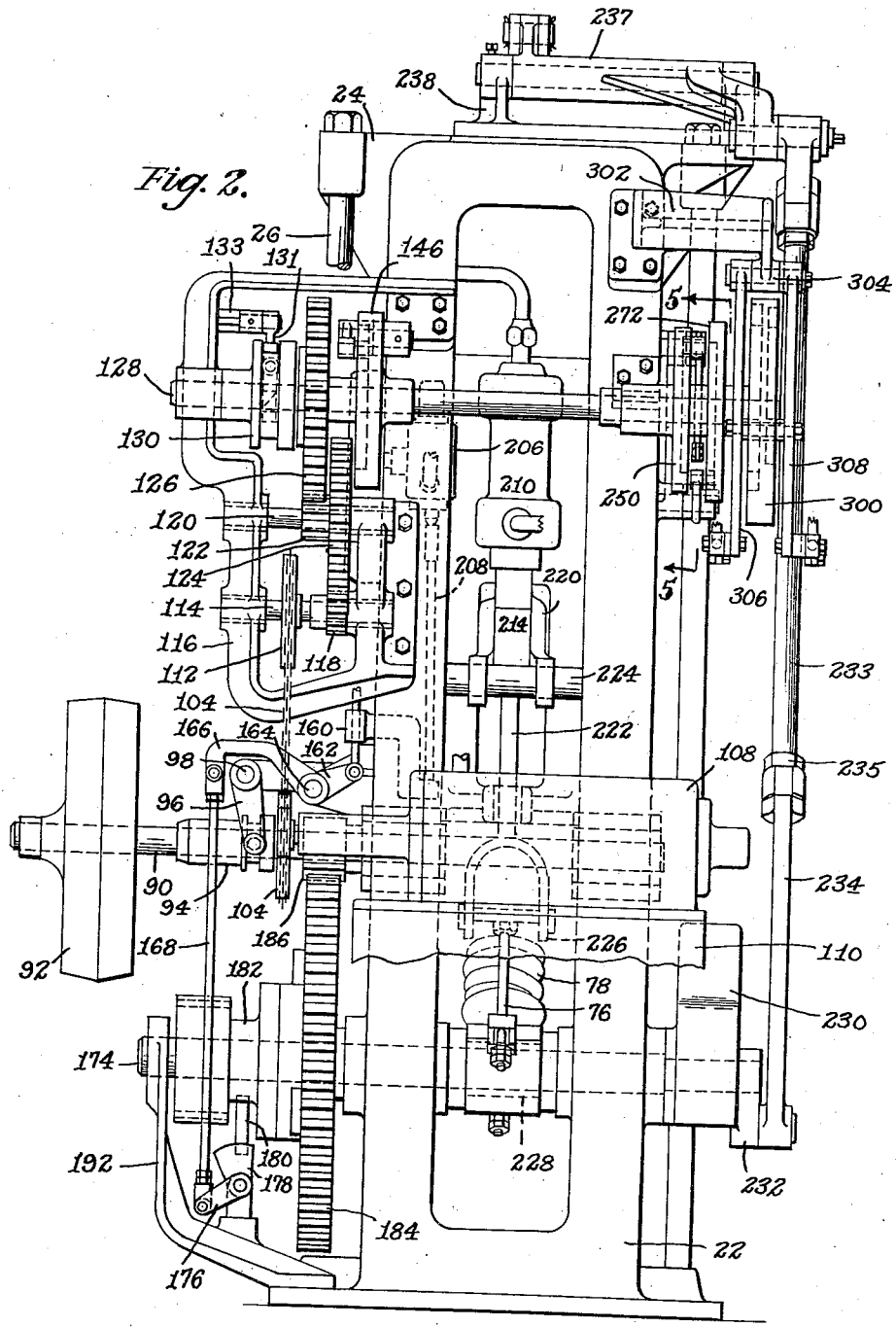

Fig. 1 is a view in side elevation from the right of a machine constructed according to the invention, Fig. 2 is a view in rear elevation, Fig. 3 is a view in side elevation taken from the left of the machine, Fig. 4 is a view in elevation along the line 4—4 of Fig. 3, Fig. 5 is a view in elevation along the line 5—5 of Fig. 2, Fig. 6 is a view in front elevation of the upper part of the machine, Fig. 7 is a view in cross section along the lines 7—7 of Fig. 6, Fig. 8 is a view in side elevation of the feeding mechanism, Fig. 9 is a view partly in side elevation and partly in section of the feed mechanism, showing its relation to the molds, Fig. 10 is a view in side elevation of the feed mechanism as it appears after the cycle of the machine has begun, Fig. 11 is a plan view of the feed plate, Fig. 12 is a view in cross section along the line 12—12 of Fig. 6, Fig. 13 is a view in elevation along the line 13—13 of Fig. 12, Fig. 14 is a detailed view of the doffer hook, Fig. 15 is a fragmentary view in front elevation showing the machine adapted for the molding of stitchdown counters, Fig. 16 is a view along the line 16—16 of Fig. 15, and Figs. 17 and 18 are views showing details of the doffing clamp for stitchdown counters.

Before proceeding to a detailed description of the machine it will be convenient first to outline its general construction, manner of operation, and principal movements. The operator of the machine bends a counter blank 390 into a curve and inserts it in a spring clip disposed on the upper surface of a horizontal feeder plate 374, as shown in Fig. 8. The machine then operates to advance the feeder plate into the machine and also to tilt it into vertical position as shown in Fig. 9. When this has been accomplished, the curved counter blank has been placed over a central mold or plug 20 upon which the molding operation is carried out. A pair of concave side molds 28 is mounted in the upper part of the frame for a limited vertical movement, and the individual molds 28 are arranged to swing toward each other from open position to engage and mold the counter blank on the plug 20. The plug 20 is carried by a vertically movable bed piece 34 mounted on the short arm of a bell crank lever 60. By means fully described below the lever 60 is moved through two distinct steps to raise the plug 20 into engagement with the side molds 28. The feeder plate 374 is also moved upwardly during the first upward movement of the plug 20 after which it is retracted and moved outwardly in position to receive another counter. At this time the plug 20 has been moved upwardly so that it is engaged by the concave molds 28 and preliminary pressure is exerted on the counter 390. As the lever 60 is rocked further, the side molds 28 are caused to impart final molding pressure to the counter, this second rocking step being carried out twice during each cycle of the machine. Simultaneously with the final rocking steps a wiper plate 242 is twice reciprocated vertically to form a flange at the base of the counter. Subsequently the molding pressure is entirely released, the plug 20 is rocked outwardly as shown in dotted lines on Fig. 12, and a doffer hook 296 is passed across the face of the plug 20 and removes the completely molded counter, tossing it to one side.

Passing now to the construction of the machine herein illustrated, it will be found to have an upright frame 22 including spaced side members joined by a heavy base plate. A cross girt 24 is secured to the upper portion of the frame by heavy bolts and tied to the base plate by a pair of tie rods 26, a construction which gives the frame assembly adequate strength for the severe duty demanded of it. The frame is provided with bearings for a driving shaft 90, a driven shaft 174, and for a transverse shaft or journal 62 from which the main pressure lever 60 is suspended, all as will presently be described. The molds 28 are pivoted together and suspended in the machine frame between a pair of inclined toggle links 30. The links have cylindrical ends which fit into corresponding sockets formed in the cross girt 24 and in the molds 28 respectively. Each of the links 30 is engaged by the upper end of an oblique adjusting screw 32 by which the molds 28 may be centered and properly adjusted with reference to the plug 20. When the bed piece 34 is elevated early in the cycle of the machine, the plug 20 carries the molds 28 bodily upwardly and they are also swung inwardly by the action of the toggle links 30, thus bringing about the preliminary engagement of the counter blank as already described.

At the upper face of the bed piece 34 is bolted a pair of brackets 80 each of which carries an oblique plunger 82 backed by a heavy compression spring 84 and an adjusting screw 83. Each plunger carries at its upper end a contact piece 86 which, when the bed piece is elevated, is arranged to engage an inclined face in the lower end of one of the molds 28. In the stopped position of the machine the contact pieces 86 are spaced from the corresponding faces of the molds 28 and do not affect the preliminary closing action thereof. It is only after the bed piece 34 has been lifted sufficiently to take up this lost motion that the final molding pressure is imparted to the molds through the combined action of the toggle links 30 and the plungers 82.

The plug 20 is pivotally secured at its outer end to a flat plate 36 (see Fig. 12) which is carried in ways on the top of a cylindrical threaded base 38 carried by the bed piece 34 and rendered vertically adjustable by means of a nut 39. A stop 40 limits the forward rocking of the plug 20. At the rear of the flat plate 36 is a slotted spring-standard 42 which carries an L-shaped piece 44 having slots which permit it to slide on stops 48 adjustably screwed in the slot in the standard 42. A spring 46 connects the short arm of the member 44 with a pin on the standard 42 and urges the L-shaped member downwardly into contact with a pin 50 which extends inwardly from the rear of the plug 20.

Suspended from the shaft 62 is a bell crank lever 60 which is pivotally connected to the bed piece 34, which has the shape of an inverted U, by a cross pin 64. Pivotally secured at the lower end of the bed piece 34 is a pair of links 66 which are equal in length to the distance from the pin 64 to the shaft 62 and which rotate about studs 68 secured to the frame 22. It will now be seen that if the lever 60 is rocked about its shaft 62, the bed piece 34 will be forced upwardly, inasmuch as it forms part of a parallel linkage assembly. At the rear of the lever 60 (see Fig. 3) is a track on which slides a carriage 70 the movement of which is limited by upper and lower air cushion bumpers 72 adjustably secured to the lever 60. The carriage 70 is provided with a cross pin 74 which provides a pivotal connection between the carriage and a link 76. Two separate trains of mechanism have a common point of application to the cross pin 74 and act cooperatively to impart separate movements to the carriage 70 and thereby to the pressure lever 60.

The first of these trains is mechanically actuated and includes the link 76 which is provided with projecting ears at its forward end to receive the cross pin 74. At its rear end the link 76 encircles an eccentric 228 formed on the driven shaft 174 already mentioned as journaled in bearings provided in the side members of the machine frame 22. The link includes in its construction a heavy compression spring 78 and is arranged to yield longitudinally to a slight degree under any abnormal pressure. It will now be expedient to describe the mechanism for driving the shaft and actuating the eccentric 228.

The driving shaft 90 is provided with a pulley 92 running freely on the shaft 90 as a journal. A conventional clutch 94, arranged to engage the pulley 92, is actuated by a link 96 which is fast to a rock shaft 96 extending to the front of the machine and provided with a handle 100 so that the clutch 94 may be manually controlled by the operator of the machine. A sprocket 102 is keyed on the shaft 90 and through a chain 104 drives a sprocket 106 disposed on the shaft of an oil pump 108 located at the rear of the machine and mounted on an oil reservoir 110. Bolted to the frame of the machine is a bearing bracket 116 in which is journaled a stub shaft 114 which carries a sprocket 112. The chain 104 also drives the sprocket 112 from the sprocket 102.

Keyed to the stub shaft 114 is a pinion 118 which meshes with a gear 124, keyed on another stub shaft 120 also journaled in the bearing bracket 116. Keyed on the stub shaft 120 is a pinion 122 which is in mesh with a large gear 126 keyed by means of a conventional clutch 130 to a cam shaft 128 also journaled in the bearing bracket 116 and running across the entire rear end of the machine. The clutch 130 is operated by a link 131 carried by a rocking stud 133 secured to the bracket 116 and fast on the end of a control rod 132 upon which is a compression spring 134, which tends to move the rod 132 in and disengage the clutch 130, and a handle 138. The control rod 132 passes through a bracket 136 which is bolted to the side of the frame 22 and provided with a socket 140 for a pin 142.

Fast on the cam shaft 128 is a cam 146. A cam follower 148 is disposed in the track on the cam 146 and is carried on the end of a rocker arm 150 which is pivotally mounted on a stud 152 on the frame of the machine. The outer end of the rocker arm 150 is pivotally connected to a vertical rod 154 which passes through a bearing bracket 158. A compression spring 156 is disposed around the rod 154 above the bracket 158 and serves to balance the weight of the rod 154 and aid the cam 146. Adjacent its lower end the rod 154 is fast to a collar forming part of an angular member 160. The lower end of the rod 158 is pivotally connected to a link 162 which is fast to a rock shaft 164. At the rear end of the rock shaft 164 is a link 166 which is lifted when the rod 154 is depressed by the action of the rocker arm 150 and the cam 146. A vertical rod 168 is secured to the link 166 at its upper end and at its lower end to a link 176 pivotally mounted on a bearing bracket 192 and fast to a segmental member 178 normally disposed in the path of a finger 180 which operates a conventional clutch 182 on the driven shaft 174. When the rod 168 is lifted, the segment 178 is moved out of the path of the finger 180, the clutch 182 is engaged and the driven shaft 174 is caused to rotate by means of a large gear 184 controlled by the clutch 182 and meshing with a pinion 186 on the driving shaft 90. It is the rotation of the shaft 147 which operates the eccentric 228 as heretofore explained. A rod 170 is suitably connected to the rock shaft 164 and its lower end is connected to a link 190 controlling a brake band 188 disposed around the shaft 174 and tensioned by a spring 194. The link 190 is also secured to a vertical rod 196 connected to a compression spring 198 carried by a bar 200 which is bolted to the bearing bracket 192. It will be apparent that when the rod 168 is lifted to engage the clutch 182, the rod 170 is simultaneously lifted to release the brake 188, the timing being arranged so that the brake releases just before the clutch engages. The angular member 160 is connected to a rod 208 which controls a valve 206, and the cam 146 is so arranged that as the cycle of the machine begins a preliminary dwell is encountered by the cam follower which is sufficient to open the valve 206 by reason of the fact that the rod 154 is depressed. However, while the cam is on the preliminary dwell, the rod 154 is not sufficiently depressed to relieve the brake 188 and engage the clutch 182.

Before understanding how the cam 146 is timed in relation to the other movements of the machine, it will be necessary to describe briefly the second train of mechanism, which is hydraulic and which is fully described in my prior U. S. Patent No. 2,085,731 granted July 6, 1937. Reference to the said patent may be had for information concerning details of the hydraulic system. The oil pump 108 draws oil from the reservoir 110 and discharges it through a pipe 204 leading to a control valve 206 regulated by the cam 146 through the rods 154 and 208. When the rod 154 is depressed, the rod 208 is lowered opening the valve 206 and allowing oil under pressure to reach a piston enclosed in a cylinder 210. The piston actuates a piston rod 212 which is adjustably connected at its lower end to a head 214 which has a downwardly projecting guide rod 222 working in bearings provided in the machine frame. The position of the head 214 upon the piston rod 212 may be adjusted by turning an adjusting nut 216 which projects into slots in the sides of the head. The head 214 is provided with a transverse slot through which projects a cross pin 218 which extends between the arms of a yoke 220 journalled to swing upon a fulcrum shaft 224 secured in the side members of the main machine frame 22. The yoke 220 is pivotally connected at its outer end to a vertical link 226 which is forked at its lower end for connection with the carriage 70 through the cross pin 74, as shown in Fig. 3. The downward swinging movement of the yoke 220 under the actuation of hydraulic pressure from the cylinder 210 is effective to move the carriage 70 downwardly from its elevated position against the upper stop 72 to its lower position against the other stop 72 and in this movement the lever 60 is rocked forwardly sufficient to bring the molds 28 into position of preliminary engagement with the counter blank.

On the end of the driven shaft 174 is a counterweight 230 and a crank 232 secured to which is an inclined crank rod 234 having an extension 233 which may be adjusted by regulating the nuts 235. At its upper end the crank rod terminates in a head pivotally secured to a rocker arm 236 which is integral with a sleeve 237 carried on a rock shaft 239 journalled in bearings 238 on the top of the frame 22. A forwardly extending arm 241 is also integral with the sleeve 237 and pivotally connected to a head 243. A vertical rod 240 is threaded into the head 243 at its upper end and carries at its lower end a wiper plate 242 which reciprocates vertically in ways 244 bolted to the cross girt 24. The wiper plate 242 forms a flange at the base of a counter on the plug 20.

Referring to Fig. 1, it should be explained that, when so desired, the machine may be operated under treadle control instead of automatically operated by the cam 146. A treadle 450, pivotally mounted on a stud 452 on the frame 22 of the machine, is normally elevated by a spring 454 secured at its upper end to the rock shaft 164. The treadle 450 is also connected to the rock shaft 164 by means of a vertical rod 456 and a link 457 so that when the treadle 450 is depressed, the rock shaft 164 will be turned counter-clockwise. It should now be explained that the rod 154, which is actuated by the cam 146 to rock the shaft 164, is connected to the rocker arm 150 by the pin 142. That is to say, when the pin 142 connects the rod 145 to the arm 150, the treadle cannot be operated inasmuch as the shaft 164 cannot be moved except by the cam 146 and the rocker arm 150. The pin 142, as heretofore mentioned, is also adapted to fit into the socket 140 to lock the rod 132 in inoperative position; i. e. when the clutch 130 is out of engagement and the handle 138 is pushed in. It will also be seen that when the pin 142 is removed from the connection between the rod 154 and the arm 150, the connection between the cam 146 and the trains of mechanism is broken, and these mechanisms can only be operated by depressing the treadle 450. Inasmuch as the pin 142 is always placed in the socket 140 when the treadle is to be used, there is no danger that the machine will turn over inadvertently and the operation of changing the molds is thus not charged with danger to the safety of the operator, especially since the spring 134 holds the clutch rod 132 in disengaged position. The treadle 450 is used when the molds are being changed or adjusted, inasmuch as the operator may depress the treadle 450 sufficiently to actuate the hydraulic mechanism and impart preliminary molding movement to the molds and then release the treadle and the molds without necessarily causing the machine to go through its full cycle and possibly damage the molds, in the event they are not properly adjusted. This is a great advantage over known automatic machines, wherein the operator can only tell whether he has properly adjusted the molds by causing the machine to go through a full cycle, and it will thus be seen that the pin 142 is a double safety feature.

The principal movements of the machine have now been described, and before discussing the automatic feeding and doffing mechanisms it will be convenient to summarize what has already been described. When the operator engages the main clutch 94 by throwing the handle 100, the shaft 90 rotates, and the oil pump 108 and the gear 126 are driven from the sprocket 102. The cam shaft clutch 130 is then engaged by (assuming that the pin 142 now connects the rod 154 to the arm 150) throwing the handle 138, whereupon the cam 146 turns and actuates the rod 154 first to open the valve 206 to permit the hydraulic train to depress the carriage 70 and secondly to engage the clutch 182 and release the brake 188 to permit two revolutions of the shaft 174 thus twice causing the eccentric 288 to rock the link 76 and the lever 60 outwardly and actuating the crank rod 234 to reciprocate the wiper plate 242.

The machine also operates to feed counter blanks automatically and to remove molded counters from the plug 20. The means for accomplishing these ends are driven from the cam shaft 128. Fast on the shaft 128 adjacent the frame 22 is a cam 250, as shown in Figs. 2, 3 and 5, which is provided with a cam follower carried by an arm 252 pivotally mounted on the frame 22 by a stud 254. The arm 252 is fast to a vertical link 256 which is connected at its end to a collar 257 which slides on a rod 258 against the action of a compression spring 260. When the cam 250 turns, the rod 258 is moved forward under yielding pressure, the outer end of the spring 260 abutting a nut which regulates the length of the rod 258. The outer end of the rod is pivotally connected to a link 262 which is fast on a shaft 264 journalled in the frame 22 and carrying another link 266 on its inner end. A pin 268 passes horizontally through the upper end of the link 266 and runs behind the plug 20, as shown in Fig. 4. The cam 250 thus acts through the rod 258 and the pin 268 to rock the plug 20 outwardly, near the end of each cycle of the machine. The plug 20 is restored to its normal position by the spring 46, as previously explained (see Fig. 12).

Adjacent the cam 250 and on the cam shaft 128 is a second cam 272 having a cam follower on the end of a rocker arm 274 pivotally mounted on the frame 22. The forward end of the arm 274 is pivotally connected to an inclined link 278 having a collar 280 secured to its upper end. The collar 280 is adjacent a shaft 282 carrying a bevel gear 284 at its inner end and journaled in a bracket 288 bolted to the frame 22. Integral with the collar 280 is a gear segment 286 which meshes with the bevel gear 284, the collar 280 being pivotally mounted on a stud in the bracket 288. It will now be seen that the turning of the cam 272 moves the rod 278 upwardly and swings the segment 286 up and down, thus causing the shaft 282 to turn. At the outer end of the shaft 282 is a weight 290 and a socket 292 in which is secured a rod 294 carrying a picker 296 at its outer end. At the proper time during the cycle of the machine the turning of the cam 274 causes the rod 294 to swing over and back across the face of the machine so that, on its return stroke, the picker 296 rubs across the outer surface of the mold 20 which has then been rocked outwardly by the pin 268, as previously explained. The flange of the molded counter is engaged by the picker 296, and the counter is removed from the plug 20 and tossed to one side.

The track on the cam 274 is arranged so that the doffer 294 remains in its outermost position until the wiper plate 242 has made its two strokes and then swings over the face of the plug 20. If the molded counter has slipped forwardly, the picker 296 pushes it back, thus ensuring engagement every time while the molded counter occupies a definite position in the machine. This contributes, of course, to accurate operation of the machine and ensures picking up the counter each time without danger of missing.

At the outer end of the cam shaft 128 is a cam 300 which has a cam track cut in both faces. A bracket 302 bolted to the top of the frame 22 provides bearings for a stub shaft 304 which overhangs the cam 300. Pivotally mounted on the stub shaft 304 is a pair of arms 306 and 308 having cam followers secured intermediate their ends and arranged to ride in the tracks on the cam 300. Long connecting rods 310 and 312 are pivotally connected to the lower ends of the arms 306 and 308 and extend to the front of the machine. The detail shown in Fig. 7 applies to both rods 310 and 312 and shows that the rod 310 has a sleeve 314 over its outer end and a casing 318 over the sleeve. In the casing is a bolt 324 backed up by a spring 322 and extending into a notch in the sleeve 314 and forms a safety catch. The cam 309 acts to reciprocate the rods 310 and 312 and it will be apparent that if there is an obstacle in the way of the forward stroke, the bolt 324 will be depressed under any unusual pressure and the sleeves 314 and 316 will slide through their casings without actuating any of the mechanism now to be described and which is connected to the casings. This is a safety feature and prevents damage to the machine in the event a counter becomes jammed in the feeder.

Secured to the front of the frame 22 is an auxiliary frame 326 in which is journalled a hollow shaft 328 and an inner shaft 330. Pivotally connected to the casing 320 about the shaft 312 is a link 332 having its lower end fast to the inner shaft 330. On the other end of the inner shaft 330 is a link 338. Similarly a link 334 connects the casing 318 to the hollow shaft 328 and to another link 336.

Supported in the frame 326 is a vertical rod 348 which has a spring 350 about its lower section and connects at its lower end to a link 352 (Fig. 8) fast to a rock shaft 354 journalled in the frame 326. The shaft 354 is connected to the bed piece 34 by links 356, and it will be apparent that when the bed piece is lifted the rock shaft 354 will turn and thus lift the rod 348. On the frame 326 is a standard 346 through which pass guide rods 347 as well as the rod 348. A slotted table 344 is supported on the standard 346 by the guide rods 347 on which it slides up and down. A flat plate 349 is secured to the end of the rod 348 and acts as a piston to move the table 344 up and down. The table 344 is provided with dovetail grooves on which slide a slotted table 360 which has a rack 362 at one side and a yoke 363 extending downwardly through the slot in the table 344. A third table 370 slides in grooves in the table 360 and is provided with a downwardly extending yoke 371 and brackets 364 for a horizontal shaft 366 which carries a segmental gear 368 in mesh with the rack 362.

The yoke 363 is connected to the upper end of the link 336 by means of a short pivoted link 342, and the yoke 371 is connected to the link 338 by another short link 340. It will be apparent that the link 338 moves both the tables 360 and 370 on the stationary table 344 and that the link 336 moves only the table 370 so that the action of the gear 368 and the rack 362 is to rock the shaft 366.

The shaft 366 carries two bent arms 372 which together form a cup for a base member 373, and carry adjusting screws 377 which adjust the angle at which the base 373 is held in a vertical plane, the latter being journalled on a pivot pin 375 passing horizontally therethrough. An adjusting bolt 379 also permits the base to be maintained at any desired angle in a horizontal plane.

Integral with the base 373 is a flat feed plate 374 (see Fig. 11) which has a spring clip on its upper surface, comprising a pair of opposed rocker arms 376 pivotally secured to the plate by bolts 377 adjustable in slots in the plate; bolted to the arms 376 is a pair of short arms 378 connected by a spring 380 passing beneath the plate 374 and urging the rocker arms 376 together. Adjustable stops 382 are also secured to the plate 374 and carry opposed leaf springs 388. Pivotally secured to a pair of sliding plates 386 which may be moved in and out of the plate 374 and set at any desired position is a pair of rockers 384. As shown in Fig. 11, a counter 390 is slipped between the rockers 384 and the arms 376 are pressed forwardly until its ends are held in place against the stops 382 by the springs 388. The inner edges of the arms 376 guide the ends of the counter so that the operator merely has to bend the counter 390 and push it in on the plate 374. This is done while the plate is horizontal as shown in Fig. 8. The cam 300 then causes the link 336 and 338 to move forwardly simultaneously but at different speeds so that the plate 374 is tilted forward as shown in Figs. 9 and 10 and also moved bodily forward. When the plate reaches the position shown in Fig. 9 the timing of the machine is such that preliminary molding pressure is exerted, the bed piece 34 rises as the molds engage, and the plate 374 is also elevated by the rod 348. After the molds have firmly engaged the counter 390, the cam 300 causes the links 336 and 338 to rock outwardly, thus retracting the plate 374 and tilting it back to its initial horizontal position. It will be apparent that the spring clip on the plate 374 may be adjusted to accommodate counters of different sizes and materials.

The foregoing description is applicable to a complete machine for molding ordinary counters. However, counters for stitchdown shoes are made with out-turned flanges instead of the inturned flanges found in ordinary counters, and it is therefore necessary to change some of the parts of the machine to accommodate stitchdown counters. The movements of the machine remain unaffected, but it is necessary to provide a different wiper plate which will wipe the flange outwardly on its upward stroke and do nothing as it is moved down. It is also necessary to substitute a different doffer hook in place of the one previously described. These changes are shown in Figs. 15-18.

The wiper plate 394 is secured by a cross pin 424 to the rod 240 previously described as actuated by the crank arm 234. Pivoted on a pin 418 secured to the face of the wiper plate is an arm 416 which encircles a bolt 426 at its upper end and works against a rubber bumper 428. At its lower end the arm 416 carries a pin 422 on which is pivoted a bar 420. The rear of the plate 394 is recessed at 414, and the bar 420 rides in and out of the recess. When the plate is moved down the bar 420 rides out and does nothing, but on the return stroke the upper edge of the bar engages the protruding base of the counter and wipes it outwardly to form a flange.

The picker 296 is replaced by a casing 396 screwed on the end of the rod 294 and containing a spring 398 and a pointed bolt 400. A trigger 402 fits in a hole in the casing and is notched to fit the end of the bolt 400. The casing has an arm 404 in which is pivotally mounted a curved finger 408 carrying a spring 410 and working in a slot in the trigger 402. The spring 410 urges the finger into the closed position shown in Fig. 17, where one end of the finger is shown grasping the flange of a stitchdown counter 430. The open position is shown in Fig. 18. Secured to the top of the frame 22 is a stationary arm 412 which is curved at its outer end to form a stop for the finger 408. As the machine operates the rod 294 moves across the machine and then back just at the time the plug 20 is rocked outwardly. That part of the trigger 402 designated as 402' strikes the surface of the plug 20, forcing its way past the bolt 406, whereupon the spring 410 causes the finger 408 to grasp the counter flange. When the rod 294 swings back to its initial position, the finger 408 strikes the stop 412 which causes the trigger 402 to slide in, the finger releases its grasp on the counter, and the trigger is cocked, the bolt 400 holding the trigger 402 in proper position.

It should be noted that the molds are relaxed between the two final molding strokes because the eccentric turns over. Inasmuch as the hydraulic pressure is continuously maintained throughout the cycle of the machine, any compression of the counter will be followed up when the molds are relaxed and the link 76 pushed further down. In other words the hydraulic pressure tends always to push down the long connection, thus following up the counter and causing the second turn of the eccentric to bring the molds closer together.

The mechanism of my invention is useful and advantageous because it not only eliminates the necessity of employing a skilled operator but because by its use the molding machine will produce more counters per minute under commercial conditions, than machines heretofore used.

Having thus described my invention what I claim as new and desire to secure by Letters Patent of the United States is:

1. A counter molding machine which comprises a plug, side molds, a feeder, clutch controlled mechanism for actuating said plug, molds and feeder automatically, a treadle for controlling semi-automatic operation of said plug, molds, and feeder, and means for selectively and positively locking either said treadle or the clutch and preventing actuation thereof, whereby engagement of said clutch is prevented when said treadle is free to operate and vice versa.

2. A counter molding machine comprising a plug, side molds, a bell crank lever adjustably connected to said plug, a hydraulically actuated train of mechanism for rocking said lever to bring said plug into preliminary engagement with said side molds, a mechanically actuated train of mechanism for further rocking said lever to impart final molding pressure to said plug and molds, and cam controlled means for automatically operating the hydraulic train and subsequently twice operating said mechanical train before the hydraulic pressure is released.

3. In an automatic counter molding machine including a plug, side molds, and a doffing rod; a wiper plate arranged to wipe an outwardly extending flange on a counter engaged between the plug and the side molds, and a finger disposed on the end of the doffing rod for gripping and then releasing the flange formed by the wiper plate.

4. A device for doffing stitchdown counters from the plug of a molding machine, which comprises a rod arranged to be swung across the face of the plug, a trigger disposed transversely in the outer end of the rod, a spring normally holding said trigger cocked, a clamping finger connected to said trigger, a spring urging said finger in one direction, and a stop arranged to be struck by said finger on the return stroke of said rod whereby said clamp is closed when the trigger strikes the face of the plug and opened when said finger strikes the stop.

5. In a counter molding machine, a plug, means for rocking said plug outwardly at predetermined intervals, a doffing rod, means for swinging said rod across said plug when it is rocked outwardly, a trigger actuated clamp on the end of the rod, and a stop arranged to be struck on the return stroke of said rod, whereby the clamp is closed when the trigger strikes the plug and opened when the stop is struck on the return stroke of the rod.

6. Feeding apparatus for an automatic counter molding machine which comprises a slotted table provided with ways, a second slotted table slidably carried in the ways of the first table, a rack disposed on said second table, a third table slidably carried by the second table, a shaft journalled in said third table, a gear on said shaft, independent cam actuated means for moving said second and third tables, and a feeder plate carried on said shaft, whereby relative movement of said second and third tables caused said shaft to turn and tilt said feeder plate.

7. Feeding apparatus for a molding machine, which comprises a sliding carriage disposed in front of the machine, a feed plate mounted on said carriage, means for reciprocating said carriage to and from the machine, and separate means for tilting said feed plate, the two means being arranged to operate first separately and then together so that the feed plate is first tilted and then moved into the machine.

8. Feeding apparatus for a molding machine, which comprises a frame mounted on the front of the machine, a carriage slidably supported in the frame, a slotted table slidably arranged in said carriage, a rack secured to said carriage, a shaft carried in said table, a segmental gear secured to said shaft and in mesh with said rack, a feed plate secured to said shaft, a link connected to said carriage, a second link conected to said table, and means for operating said links, whereby relative movement of the links causes the shaft to turn and tilt the feed plate and coincident movement of the links causes horizontal movement of the cariage and the feed plate.

9. Feeding apparatus for a molding machine which comprises, a frame mounted in front of the machine, a cam provided with tracks on both sides thereof, a pair of rods arranged to be reciprocated by said cam, a pair of shafts journaled in said frame, links connecting said rods to said shafts, a sliding carriage disposed in said frame and linked to one of said shafts, a table slidably arranged in said carriage and linked to the other shaft, a rack and pinion connecting said carriage and table, a feed plate connected to said pinion and arranged to be tilted thereby, whereby rotation of said cam causes said carriage to reciprocate in a substantially horizontal path and also causes said feed plate to be tilted from horizontal to vertical position as said carriage moves into the machine.

10. The apparatus defined in claim 9 wherein a pair of safety catches are disposed on the ends of said rods and form the connection between the links and the rods, whereby the links will not operate if the carriage or feed plate is jammed or obstructed.

11. In a counter molding machine, a plug, means for rocking the plug outwardly at predetermined intervals, a doffing rod, means for swinging said rod back and forth across the plug when it is rocked outwardly, a clamping finger carried on the end of the rod, a trigger carried in said rod, and a stop arranged to be struck by said clamping finger on the return stroke of the rod, whereby on the first stroke of the rod the trigger strikes the plug to close the clamp and on the return stroke of the rod the finger strikes the stop to open the clamp and cock the trigger.

12. Device for doffing stitchdown counters from the plug of a molding machine, which comprises a rod, means for swinging the rod back and forth across the face of the plug, a clamp on the end of the rod, means for closing the clamp when the rod swings by the plug, and means for opening the clamp on the return stroke of the rod, whereby the outwardly extending flange of a stitchdown counter is gripped by the clamp and later released.

13. A counter molding machine comprising a plug, side molds, mechanism for automatically operating said molds, treadle means for controlling the operation of said molds, and a locking pin which may be inserted in the machine either to complete the automatic mechanism and lock the treadle or to release the treadle and lock the automatic mechanism against operation.

14. A counter molding machine which comprises a plug, side molds, hydraulic mechanism for bringing the plug into preliminary engagement with the side molds, a mechanical train arranged to bring the plug into final engagement with the side molds, and cam actuated means for first operating the hydraulic mechanism and subsequently twice operating the mechanical train.

15. A counter molding machine which comprises a plug, side molds, hydraulic mechanism for bringing the plug into preliminary engagement with the side molds, a mechanical train for bringing the plug into final engagement with the side molds, and cam operated means for first causing operation of the hydraulic mechanism and subsequently twice causing operation of the mechanical train without relaxing the hydraulic mechanism.

16. A counter molding machine comprising a frame, a plug mounted in the frame, a pair of side molds carried by the frame, a hydraulic train for bringing the plug into preliminary engagement with the side molds, a mechanical train for bringing the molds into final engagement with the side molds, a feeder, a doffing mechanism, a shaft journaled in the frame, a cam secured to said shaft and arranged to cause operation of said hydraulic train first and then to cause operation of said mechanical train, a second cam also secured to said shaft for operating said doffing mechanism, and a third cam secured to said shaft and arranged to operate said feeder.

17. A counter molding machine which comprises a plug, side molds, mechanism for automatically and continuously actuating said plug and molds, a treadle for controlling semi-automatic operation of the plug and molds, and means for selectively locking either the automatic mechanism or the treadle, whereby the automatic mechanism may not be operated when the treadle is operable and vice versa.

18. Feeding apparatus for a molding machine, which comprises, a feed plate mounted in front of the machine, means for reciprocating the feed plate, means for tilting the feed plate, the said two means being arranged to operate first separately and then together so that the feed plate is first tilted and then advanced into the machine.

19. Feeding apparatus for a molding machine, which comprises, a carriage slidably mounted in front of the machine, a feed plate pivotally mounted on said carriage, mechanism for reciprocating the carriage, mechanism for tilting the feed plate, and cam controlled means for first operating the tilting mechanism and subsequently operating the tilting mechanism simultaneously with the reciprocating mechanism.

20. A counter molding machine comprising a plug, side molds, hydraulically operated mechanism for bringing the plug and side molds into preliminary engagement, and mechanically actuated mechanism for twice imparting final molding pressure to the plug and side molds before the hydraulic pressure is released.

CHARLES W. BAILEY.